United States Patent
Geng et al.

(10) Patent No.: US 12,389,322 B2
(45) Date of Patent: Aug. 12, 2025

(54) POWER SAVING TECHNIQUES FOR BB-RF INTERFACE

(71) Applicant: GREATER SHINE LIMITED, New Taipei (TW)

(72) Inventors: Jifeng Geng, San Diego, CA (US); Hong Kui Yang, San Diego, CA (US)

(73) Assignee: GREATER SHINE LIMITED, New Taipei (TW)

( * ) Notice: Subject to any disclaimer, the term of this patent is extended or adjusted under 35 U.S.C. 154(b) by 345 days.

(21) Appl. No.: 17/882,028

(22) Filed: Aug. 5, 2022

(65) Prior Publication Data

US 2022/0377661 A1 Nov. 24, 2022

Related U.S. Application Data

(63) Continuation of application No. PCT/US2020/067037, filed on Dec. 24, 2020.

(60) Provisional application No. 62/970,323, filed on Feb. 5, 2020.

(51) Int. Cl.
*H04W 52/02* (2009.01)
*H04W 52/24* (2009.01)

(52) U.S. Cl.
CPC ....... *H04W 52/0209* (2013.01); *H04W 52/24* (2013.01)

(58) Field of Classification Search
CPC .......................... H04W 52/0209; H04W 52/24
See application file for complete search history.

(56) References Cited

U.S. PATENT DOCUMENTS

| | | | |
|---|---|---|---|
| 7,009,533 B1 | 3/2006 | Wegener | |
| 11,863,232 B2* | 1/2024 | Wang | H03M 3/42 |
| 2004/0213170 A1* | 10/2004 | Bremer | H04L 5/16 370/282 |
| 2007/0060190 A1* | 3/2007 | Sanders | H04L 5/0044 455/522 |

(Continued)

FOREIGN PATENT DOCUMENTS

| CN | 102037694 A | 4/2011 |
|---|---|---|
| CN | 109417431 A | 3/2019 |

OTHER PUBLICATIONS

International Search Report in the international application No. PCT/US2020/067037, mailed on Mar. 25, 2021, 2 pages.

(Continued)

*Primary Examiner* — Hassan A Phillips
*Assistant Examiner* — Sang C Lee
(74) *Attorney, Agent, or Firm* — BAYES PLLC

(57) ABSTRACT

Introduced here are techniques for reducing the average throughout of a baseband (BB)-radio frequency (RF) interface. The techniques include removing excess bits from a received signal based on the signal to noise ratio (SNR), rotating the reduced signal to direct current frequency, and applying a coding scheme to further compress the signal. After compression, the signal can be transmitted from one chip to another. The receiving chip can retrieve the signal by rotating the signal to its original frequency and retrieving the removed bits based uplink gain information. By doing so, the number of bits being transmitted is reduced and thus, the average throughput of the BB-RF interface is also reduced.

18 Claims, 6 Drawing Sheets

(56) References Cited

U.S. PATENT DOCUMENTS

| | | | |
|---|---|---|---|
| 2007/0286065 A1* | 12/2007 | Wang | H04L 5/0007 |
| | | | 370/208 |
| 2009/0073006 A1* | 3/2009 | Wegener | G10L 19/002 |
| | | | 341/61 |
| 2009/0141827 A1* | 6/2009 | Saito | G11C 29/025 |
| | | | 375/295 |
| 2009/0154446 A1* | 6/2009 | Adler | H04B 1/40 |
| | | | 370/310 |
| 2014/0006908 A1* | 1/2014 | Gruber | H04L 1/0072 |
| | | | 714/776 |
| 2016/0323126 A1* | 11/2016 | Masuda | H04L 25/0262 |
| 2019/0034370 A1 | 1/2019 | Kondo et al. | |
| 2019/0140793 A1* | 5/2019 | Takeda | H04J 11/00 |
| 2020/0186206 A1* | 6/2020 | Estella Aguerri | H04B 7/0413 |

OTHER PUBLICATIONS

Written Opinion of the International Search Authority in the international application No. PCT/US2020/067037, mailed on Mar. 25, 2021, 5 pages.

First Office Action of the U.S. Appl. No. 17/817,892, issued on Nov. 1, 2024. 26 pages.

First Office Action of the Chinese application No. 202080095572.6, issued on Mar. 26, 2025. 20 pages with English translation.

* cited by examiner

POWER SAVING TECHNIQUES FOR BB-RF INTERFACE

CROSS-REFERENCE TO RELATED APPLICATIONS

This application is a continuation of International Application No. PCT/US2020/067037 filed on Dec. 24, 2020, which claims the benefit of priority to U.S. Provisional Application No. 62/970,323, filed on Feb. 5, 2020, both of which are hereby incorporated by reference in their entireties.

BACKGROUND

In wireless communication systems, generally, the baseband (BB) and radio frequency (RF) functions are in separate chips. These chips are interconnected by a BB-RF interface. Data is transmitted across the BB-RF interface based on the requirements of the wireless communication systems. Namely, with the pervasiveness of 4th generation wireless technology (4G) and the growing deployment of 5th generation (5G) technology, the data transmitted across the BB-RF interface generally need to occur at higher throughput rates.

In addition to high throughput rates, power consumption is an important factor. Power consumption is especially important in mobile devices because of their limited battery capacities. Thus, it is desirable to have techniques that help balance the need to reduce power consumption with the need to perform at high throughput rates.

SUMMARY

The disclosed teachings relate to power saving techniques for a network device. More particularly, the disclosed teachings relate to techniques for reducing power consumption by a baseband (BB)-radio frequency (RF) digital interface of a network device.

According to a first aspect of the embodiments of the disclosure, there is provided a method for saving power during data transfer between chips coupled to a baseband (BB)-radio frequency (RF) interface. The method includes: receiving one or more resource blocks including symbol information; and for a given resource block in the one or more resource blocks: determining, based on the symbol information, a number of excess bits within the given resource block; removing the number of excess bits from the given resource block; performing data compression on the given resource block based on (1) rotating the given resource block around a direct current frequency and (2) applying a coding scheme on the given resource block to form a compressed resource block; and transmitting the compressed resource block through the BB-RF interface.

According to a second aspect of the embodiments of the disclosure, there is provided a method for saving power during data transfer between chips coupled to a baseband (BB)-radio frequency (RF) interface. The method includes: receiving a compressed resource block, wherein the compressed resource block is a result of a decompressed resource block being (1) reduced by removing excess bits based on a signal to noise ratio, (2) rotated to direct current frequency, and (3) compressed based on an application of a coding scheme; and decompressing the compressed resource block based on (1) rotating the compressed resource block to an original frequency and (2) recovering excess bits based on uplink gain information.

According to a third aspect of the embodiments of the disclosure, there is provided a system including a processor and a memory. The memory has instructions stored thereon that, when executed by the processor, cause the system to: receive one or more resource blocks and symbol information; and for a given resource block in the one or more resource blocks: determine, based on the symbol information, a number of excess bits within the given resource block; remove the number of excess bits from the given resource block; perform data compression on the given resource block based on (1) rotating the given resource block to direct current and (2) applying a coding scheme to the given resource block to form a compressed resource block; and transmit the compressed resource block on a baseband (BB)-radio frequency (RF) interface.

BRIEF DESCRIPTION OF THE DRAWINGS

The present embodiments are illustrated by way of examples and are not intended to be limited by the figures in the accompanying drawings.

DETAILED DESCRIPTION

Figure 1:
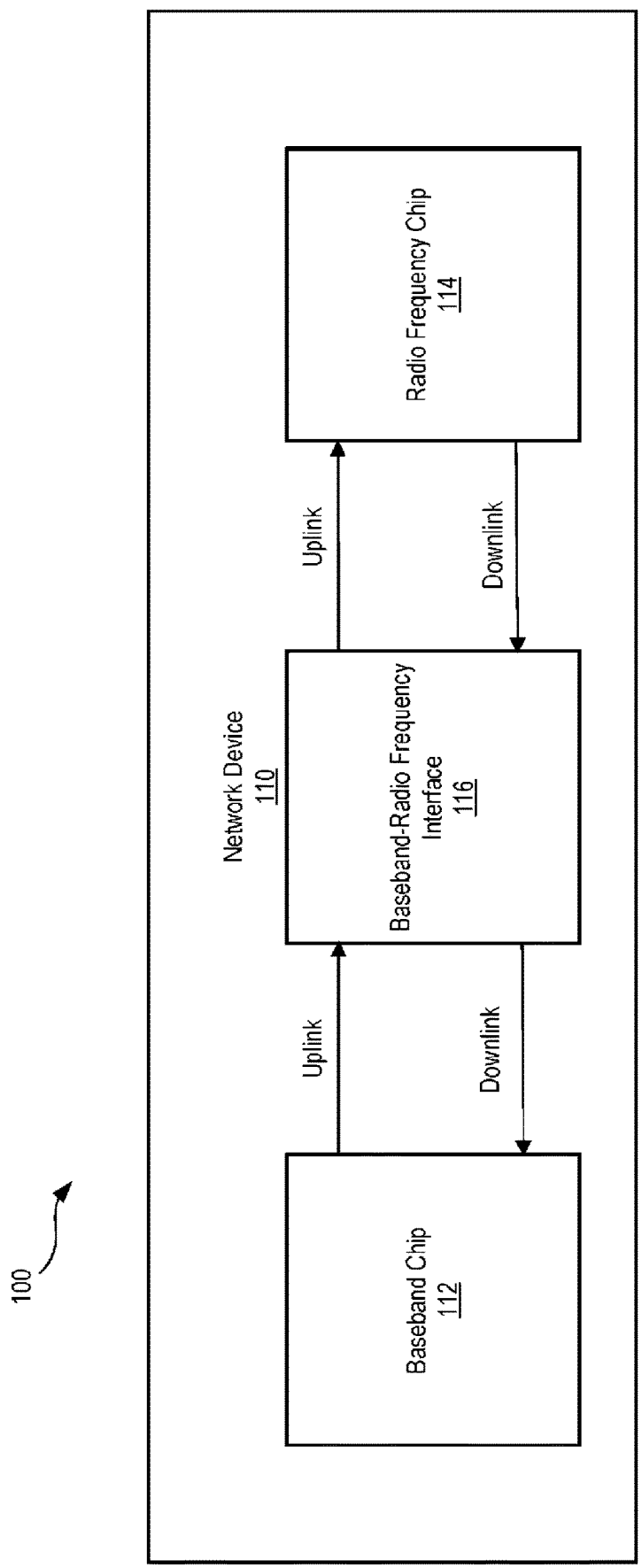
FIG. 1 illustrates a high-level block diagram of a network device with a BB chip and RF chip interconnected by a BB-RF interface.

Modern telecommunication systems include separate chips for baseband (BB) and radio frequency (RF) functions. BB is a signal that has a near zero frequency range and aims to transfer a digital bit stream over a BB channel such as bandpass filtered channel or band-limited wireless channel. The BB chip (e.g., a BB processor) is a chip within a network that manages the radio functions within a particular frequency range. The RF chip, similarly, manages radio functions within a different frequency range. For example, the RF chip can manage radio function within 3 kHz and 300 GHz. Both chips typically include their own random access memory (RAM) and firmware.

The interface can be, for example, a serialzer and/or deserializer. A serialzer and/or deserializer is a pair of functional blocks used in high speed communications to compensate of limited input and/or output. The serialzer and/or deserializer converts data between serial data and parallel interface in each direction. The interface can operate under protocols such as the M-PHY protocols established by 3rd party organizations such as DigRF. DigRF is a group focused on developing specifications for wireless mobile interfaces. M-PHY is a high speed communication physical layer protocol standard which targets mobile multimedia devices.

Traditionally, the transmission of data between the BB and RF chips are conducted at the peak throughput rate. In other words, the BB-RF interface operates at a set throughput rate. In particular, the BB-RF interface is set to operate at the peak throughput at all times, irrespective of the number of bits being transmitted. The traditional approach to operate at peak throughput has led to several issues. A critical issue being that the power consumption of the device is negatively impacted by the constant operation at peak throughput. For example, in a terminal device (e.g., a cell phone), data transmission between two chips will draw the same amount of power whether the two chips are handling hundreds of bits of data or millions of bits of data.

To further illustrate the problem another example is described below. A BB chip may receive 100 bits in the uplink data plane. The BB chip can perform its analysis of the 100 bits and transmit the 100 bits across the BB-RF interface to the RF chip. The transmission across the BB-RF interface can occur at a peak throughput of 1,000 bits per second. Thus, the interface will be operating at the peak throughput and transmit the 100 bits across the interface in a $\frac{1}{10}$ of a second. In another example, the BB chip can receive 50 bits which include the same information as the 100 bits in the previous example. In this case, the throughput will remain at 1,000 bits/sec and transmit the data in $\frac{1}{20}$ of a second.

Accordingly, introduced here are techniques for transmitting information across the BB-RF interface using fewer bits and thereby, reducing the average throughput of the BB-RF interface, which can in turn achieve power saving. More specifically, one or more embodiments of the disclosed techniques can include removing excess bits from received data and subsequently performing data compression methods prior to sending the data across the BB-RF interface. By removing excess bits and compressing the data, the interface can have a reduced on-time (or active time) and thus, consume less power. Further, both the BB and RF chips can perform the disclosed techniques during both uplink and downlink.

In some embodiments, the number of excess bits is determined based on symbol information such as the signal-to-noise ratio (SNR). Based on the SNR, the excess bits can be removed prior to the application of data compression techniques. The data compression techniques can include rotating the data to a direct current frequency (e.g., 0 Hz) and applying coding schemes to the data. By performing these steps, the on-time of the BB-RF interface can be reduced, and thus, the average throughput is also reduced. In turn, because the average throughout is reduced, the power consumption of the BB-RF interface can also be reduced.

In the following description, the example of a mobile device is used, for illustrative purposes only, to explain various aspects of the techniques. For example, a cellular phone can include a BB chip, RF chip, and a BB-RF interface. Note, however, the techniques disclosed here are not limited in applicability to mobile devices or to any other particular kind of devices. Other devices, for example, electronic devices or systems (e.g., a tablet) may adapt the techniques in a similar manner.

Further, in some embodiments, references are made to a resource block. For illustrative purposes, a resource blocks can be described as including a certain number of bits. However, note that resource blocks generally consist of twelve consecutive subcarriers in the frequency domain. Moreover, resource blocks are carried by sinusoidal signals between the BB and RF chips.

BB-RF Interface Overview

FIG. 1 illustrates a high-level block diagram 100 of a network device 110 with a BB chip 112 and RF chip 114 interconnected by a BB-RF interface 116. The network device 110 can be a mobile device such as a cell phone (e.g., iPhone). Data can be transmitted between the BB chip 112 and RF chip 114 through BB-RF interface 116 in both the uplink and downlink directions. For example, in the uplink direction, the BB chip 112 can receive data (e.g., resource blocks) from a source that is not depicted in FIG. 1. The source can be, for example, another chip with in the cell phone.

The data is then processed by the BB chip 112. The processing can include, for example, signal modulation, encoding, and/or frequency shifting. After which, the data is transmitted to the RF chip 114 for further processing through the BB-RF interface 116. As mentioned before, the BB-RF interface is typically programmed to operate at its peak throughput. Thus, the data can be transmitted at the peak throughput of the BB-RF interface 116. Once received, the RF chip 114 can perform similar tasks as the BB chip 112 such as signal modulation, encoding, and/or frequency shifting. In the downlink direction, data can be transmitted in a similar fashion from the RF chip 114 to the BB chip 112.

In some embodiments, data is transmitted between the chips 112 and 114 in the form of resource blocks. For example, a resource block having ten bits can be transmitted, in the uplink direction, from the BB chip 112 to the RF chip 114 through BB-RF interface 116. The ten bits can be transmitted at a peak throughput of a hundred bits per second. Similarly, resource blocks can be transmitted in the opposite direction.

BB Chip and RF Chip Components

Figure 2:
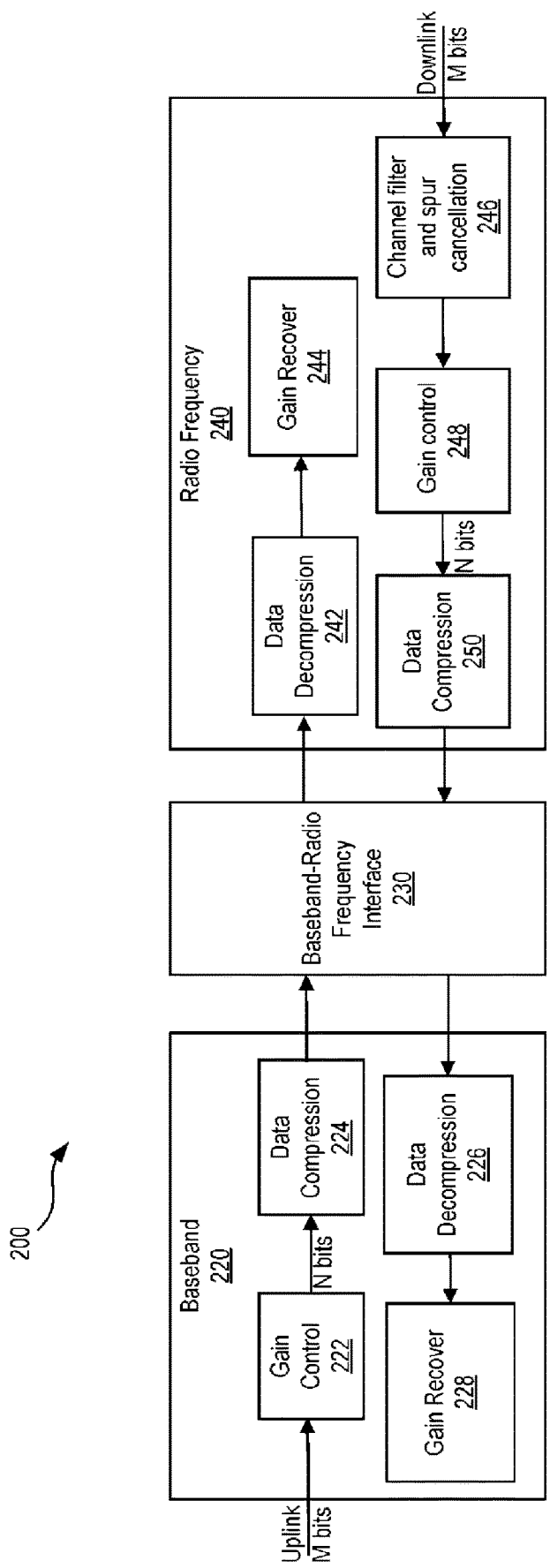
FIG. 2. illustrates a block diagram of the BB chip and RF chip as data is processed by each chip.

FIG. 2 illustrates a block diagram 200 of the BB chip 220 and RF chip 240 as data is transmitted through the BB-RF interface 230. The components depicted in FIG. 2 are similar to those depicted in FIG. 1. However, the internal components of the BB chip 220 and RF chip 240 are included in FIG. 2. Turning to the BB chip 220, it includes modules gain control 222, data compression 224, and data compression 226.

In some embodiments, the gain control module 222 determines and removes the excess bits from received data (e.g., resource blocks). In order to determine the number of excess bits, the gain control module 222 utilizes the symbol information. The symbol information can be transmitted between the chips 220 and 240 prior to the data being transmitted. Symbol information can include, for example, symbol boundary information, uplink gain information, error vector magnitude (EVM) requirements, modulation, signal-to-noise ratio (SNR), resource block configuration, and/or channel type.

In particular, the gain control module 222 can assess the SNR to determine the number of excess bits. SNR is a measurement that compares the level of a desired signal to the level of background noise. For example, a resource block can include 10 bits. The same resource block can have a SNR of 1 to 2. In other words, for every necessary bit within the resource block, there are two unnecessary bits. Thus, the gain control 222 can remove two bits for every bit that remains in view of the SNR.

In some embodiments, the gain control module 222 can also take into account other symbol information. For example, the EVM can be another factor. EVM is a measure used to quantify the performance of a transmitter or receiver. Another factor can be the modulation. Modulation is the form in which the data is transmitted. Common modulation schemes are, for example, quadrature phase shift keying (QPSK) and 256 quadrature amplitude modulation (QAM). The number of excess bits can be determined by analysis of the modulation and EVM requirements. For example, data transmission in QPSK can have a maximum of 20% EVM. This means that the data can be correctly recovered when the EVM is under 20%.

However, in some embodiments, SNR can be the overriding factor in determining the number of excess bits. For instance, a resource block with twelve bits can have a SNR of 4 to 1. The modulation scheme for the resource block can require an EVM of less than 30%. Based on the EVM, at least three bits can be removed from the resource block while still meeting the requirements. However, based on the SNR, only one bit can be removed from the resource block. Gain control module 222, due to the SNR, can remove one of the bits from the resource block.

In some embodiments, the data compression module 224 can code information using fewer bits than the original representation. Prior to coding the information, the data compression 224 can perform frequency rotation. In some embodiments, data compression 224 can rotate the resource block signal to direct current (DC) frequency. DC frequency refers to a constant zero-frequency, or slowly varying frequency. Rotating the resource block signal to DC is beneficial because of the signal changes slowly after rotation, and thus, compression can be performed without significant degradation. For example, a signal carrying the resource block can initially have a 10 MHz frequency. Moreover, the signal may fluctuate between 10 MHz and 30 MHz. At varying frequencies between 10 MHz and 30 MHz, the likelihood of signal degradation (e.g., loss of necessary bits) is more likely than at DC frequency, 0 Hz. This is because reduced frequency variations in combination with a slower frequency can result in more accurate processing.

Additionally, in some embodiments, the data compression module 224 can also apply coding schemes. Coding schemes are associated with data and provide information regarding how the recipient of the data should process the received data. In some embodiments, the coding schemes can include lossless data compression algorithms. Lossless compression allows for representation of data without losing any information so that the compression is reversible. For example, the data compression module 224 can apply differential coding schemes, encoding schemes, and/or other related schemes. Particular coding schemes can include, for example, data coding scheme (DCS) 4, DCS 240, line feed, form feed, carriage return, and/or soft hyphen. For example, the data compression module 224 can apply line feed coding to reduce the number of bits being transmitted. In another example, the data compression module 224 can apply Deflate techniques, which are commonly applied to ZIP files.

The data decompression module 226 can reverse some of the compression techniques performed by the RF chip 240 in the downlink direction. For example, the data decompression module 226 can analyze the symbol information to decompress the data such that the removed information can be recovered. This can include rotating the signal to its original frequency and retrieving removed bits. For instance, the data decompression module can analyze the modulation scheme within the symbol information to determine how many bits were removed by the RF chip 240. Subsequently, the gain recover module 228 can analyze the uplink gain information to retrieve bits loss during gain control adjustment in the RF chip 240. Thus, the uplink information in combination with the coding scheme can, for example, be used to determine how many bits were removed and their values.

Turning to the RF chip 240, the data decompression module 242 can perform similar tasks to data decompression module 226. The gain recover module 244 can perform similar tasks to gain recover module 228. In other words, data decompression module 242 can reverse the compression performed by data compression module 224 in the uplink direction. And gain recover can retrieve the bits removed by gain control 222 in the uplink direction. As such, after data is transferred, the information can be retrieved without significant degradation.

Channel filter and spur cancellation module 246 can, in some embodiments, filter a signal to remove unwanted frequencies and/or features. Additionally, spur cancellation can include removing a tone within a frequency band of a received signal. For example, a received signal can include a frequency band between 10 MHz and 30 MHz. Initially, the channel filter and spur cancellation module 246 can filter only frequencies between 15 MHz and 25 MHz. Subsequently, the channel filter and spur cancellation module 246 can cancel the 18 MHz tone; thereby, only transmitting the signal between 15-17 MHz and 19-25 MHz.

Gain control module 248 and data compression module 250 can perform the same tasks as gain control module 222 and data compression module 224, respectively. As an extension of the example above, the signal between 15-17 MHz and 19-25 MHz can be carrying one or more resource blocks. The gain control module 248 can remove excess bits based on the SNR information and the data compression module 250 can rotate the signal to DC and apply a coding scheme. After which, the signal between 15-17 MHz and 19-25 MHz can be transmitted to the BB chip through BB-RF interface 230.

Accordingly, the components of block diagram 200 can reduce the average throughput of BB-RF interface 230. For example, in the uplink direction, gain control module 222 can receive a signal carrying a resource block with M number of bits. After passing through the gain control module 222, the resource block can be reduced to N number of bits, where N is fewer than M. Data compression module 224 can then receive the resource block with an N number of bits. Data compression module 224 can further compress the resource block prior to transmission to the RF chip 240.

As mentioned before, the BB-RF interface remains at peak throughput. The BB-RF interface 230 can transmit the resource block with an N number of bits at its peak throughput rate. Due to reduction of the bits from M to N and further compression, the BB-RF interface will be operational for a less amount of amount. Alternatively, because fewer bits need to be transmitted, the intervals between the bits can be increased. For example, if M number of bits were to be transmitted in the BB-RF interface 230, it may transmit the bits within ten seconds with an interval of 0.2 seconds between each packet of bits. However, when transmitting N bits, the BB-RF interface 230 may still take ten seconds but include intervals of one second in between the packets. Alternatively, N bits can be transmitted with an interval of 0.2 seconds. In this case, the transmission would be completed in a shorter time period. Thus, in either case, even though the bits can be transmitted at peak throughout, the time in which the BB-RF interface 230 is active will be reduced. A similar reduction in the active time of the BB-RF interface 230 will occur in the downlink direction.

EVM vs. Number of Bits

Figure 3A:
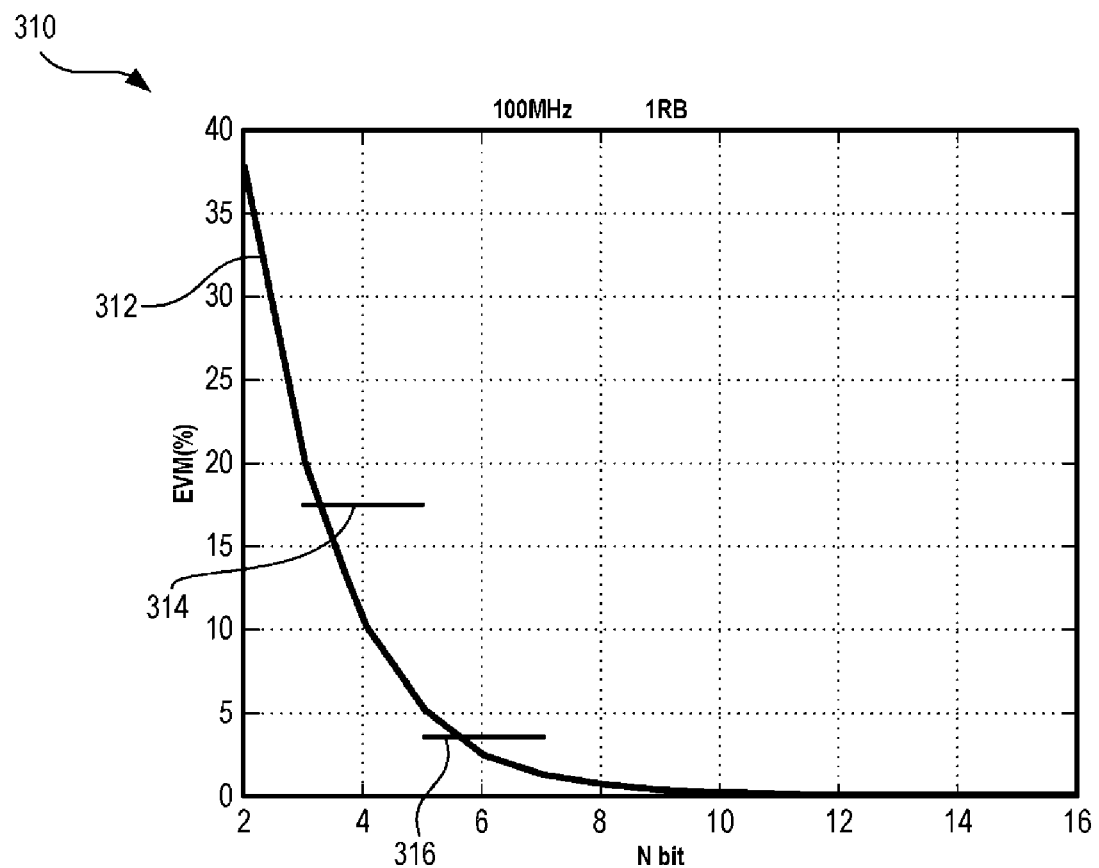
FIG. 3A illustrates a graph of the relationship between the number of bits within a resource block and the required error vector magnitude.

Generally, EVM can act as a guide for the maximum number of bits that can be removed from a resource block without degradation. FIG. 3A illustrates a graph of a relationship between the number of bits within a resource block and the required EVM. In FIG. 3A, one resource block is being transmitted at 100 MHz. EVM line 312 indicates the required EVM in relation to the number of bits within the one resource block. As depicted, EVM and the number of bits have an inverse relationship such that EVM increases when fewer bits are included in the resource block. Said another way, EVM and the number of bits that can be removed are directly related such that when fewer bits are removed, the EVM is low and vice versa. QPSK line 314 depicts the EVM requirement when the resource block is transmitted using a QPSK modulation scheme. Thus, the system only needs to transmit approximately four bits across the BB-RF interface to meet the EVM requirement. For example, if the resource block includes twelve bits, eight can be removed without violating the EVM requirement. Similarly, 256QAM line 316 depicts that approximately six bits are required to meet the EVM requirement under 256QAM. In the case where the resource block has twelve bits, six can be removed while still meeting the EVM requirements. Accordingly, the system can, based on the SNR and other information, remove up to eight and six bits depending on the modulation scheme. However, the SNR requirement may require removal of fewer bits.

Figure 3B:
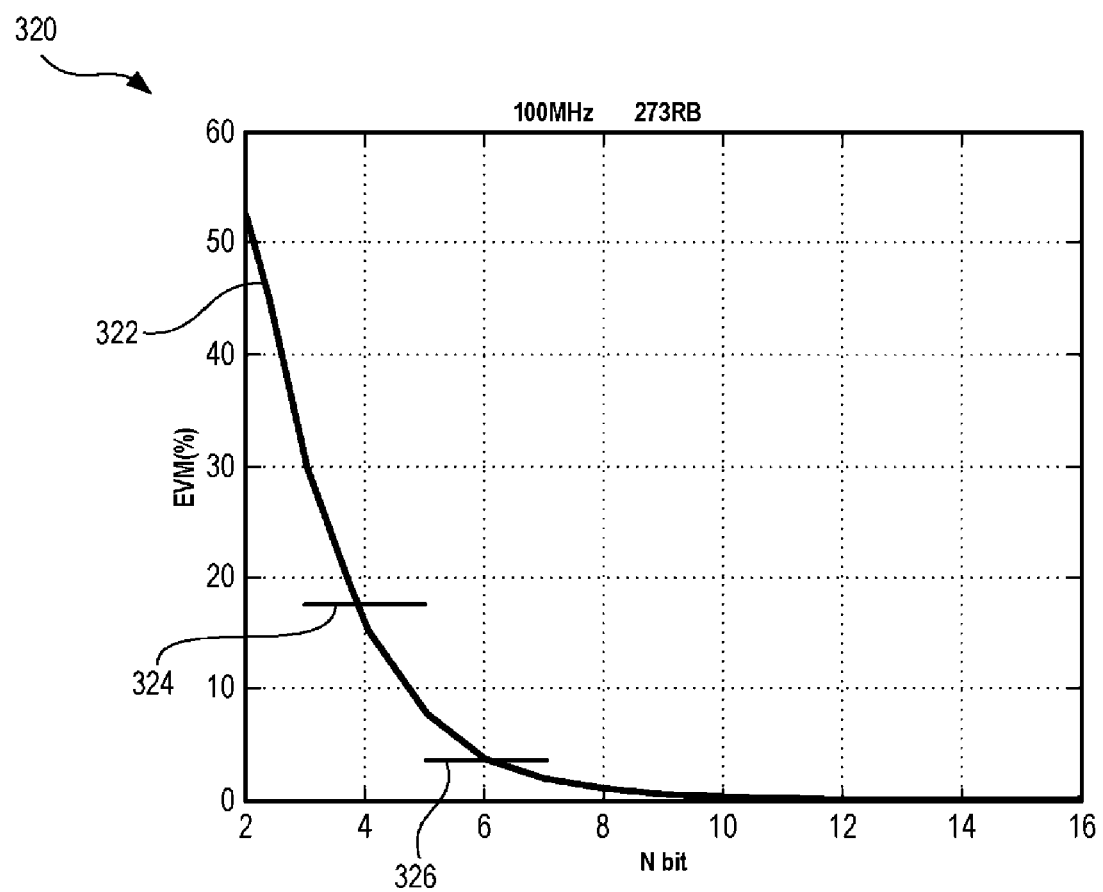
FIG. 3B illustrates another graph of a relationship between the number of bits within multiple resource blocks and the required error vector magnitude.

In a similar fashion, FIG. 3B illustrates another graph 320 of a relationship between the number of bits within multiple resource blocks and the required error vector magnitude. In FIG. 3B 273 resource blocks are being transmitted across the BB-RF interface. QPSK line 324 depicts that the system can remove approximately eight bits under QPSK modulation, even with the drastic increase in data being transmitted in comparison to FIG. 3A. 256QAM line 326 depicts that the system can remove six bits again. However, because the difference in EVM between six bits and ten bits is minimal, it may be safer to only remove two bits and keep ten bits within the resource blocks. Again, the SNR requirement may decrease the number of bits that can be removed.

Methodology

Figure 4:
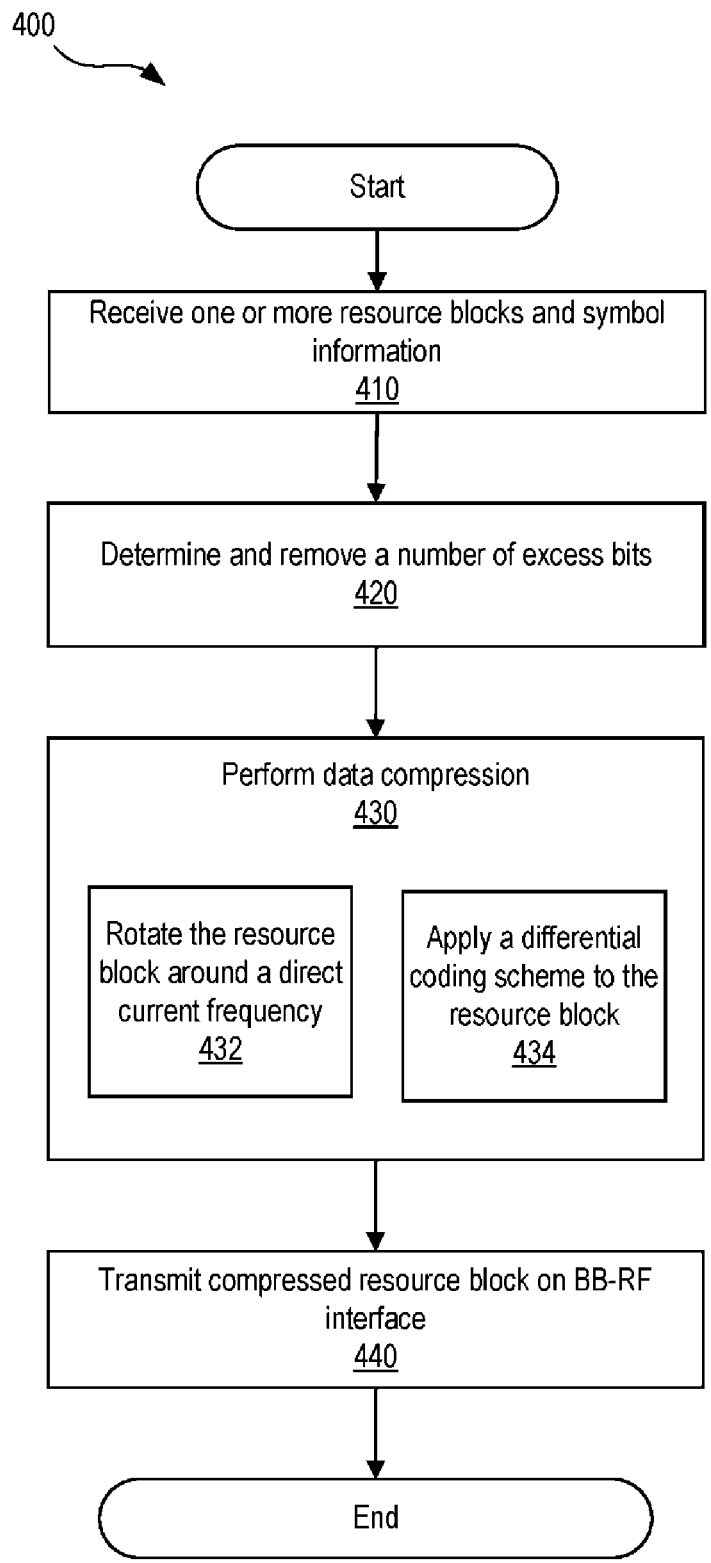
FIG. 4 is a flowchart that illustrates a method for transmitting data across the BB-RF interface.

FIG. 4 is a flowchart that illustrates a method for transmitting data across the BB-RF interface. The method can be implemented by a device have a memory and a processor that executes instructions stored in the memory. For example, the device can be a mobile user device (e.g., iPhone), which includes a BB chip and RF chip interconnected by a BB-RF interface. At block 410, one of the chips can receive one or more resource blocks and symbol information. The symbol information can be transmitted to the chip in predetermined intervals. In some embodiments, the symbol information can be transmitted prior to the receipt of the one or more resource blocks.

The symbol information can include data indicative of the SNR, modulation scheme and/or the EVM of the signal that is carrying the resource block. The EVM can be directly related to the number of excess bits (e.g., FIG. 3A-B). For example, the relationship between the EVM and the minimum number of required bits can depend upon the modulation scheme. For instance, under a QPSK scheme, the resource block requires at least six bits to meet the EVM requirements of the QPSK scheme. In another example, under a 256 QAM scheme, the resource block requires at least ten bits to meet the EVM requirements of the 256 QAM scheme.

In the uplink direction, the data is transmitted from the BB chip to the RF chip and in the downlink direction, data is transmitted from the RF chip to the BB chip (e.g., FIG. 2). Although, the method in the uplink and downlink directions may not vary significantly, the downlink direction may consist of more steps. For example, in the downlink direction, upon receipt of the one or more resource blocks, the RF chip can perform channel filtration and spur cancellation. Additionally, the excess bit analysis (e.g., at gain control module 222 in FIG. 2), can be based on the uplink gain information included within the symbol information.

In some embodiments, the techniques in the following blocks can be performed with a given resource block in the one or more resource blocks. At block 420, the chip can determine and remove the excess bits (e.g., at gain control module 222 in FIG. 2). The number of excess bits can be determined based on the symbol information and once removed, the given resource block can include a fewer number of bits that it originally included. At block 430, the chip can perform data compression (e.g., at data compression module 224 in FIG. 2). Data compression can include rotating the given resource block around a DC frequency (e.g., 0 Hz) and applying a differential coding scheme to form a compressed resource block. After which, at block 440, the chip can transmit the compressed resource block to the other chip through the BB-RF interface.

Upon receiving the compressed resource block, the other chip can decompress the compressed resource block by rotating it back to the original frequency and recovering the excess bits based on the uplink gain information.

Figure 5:
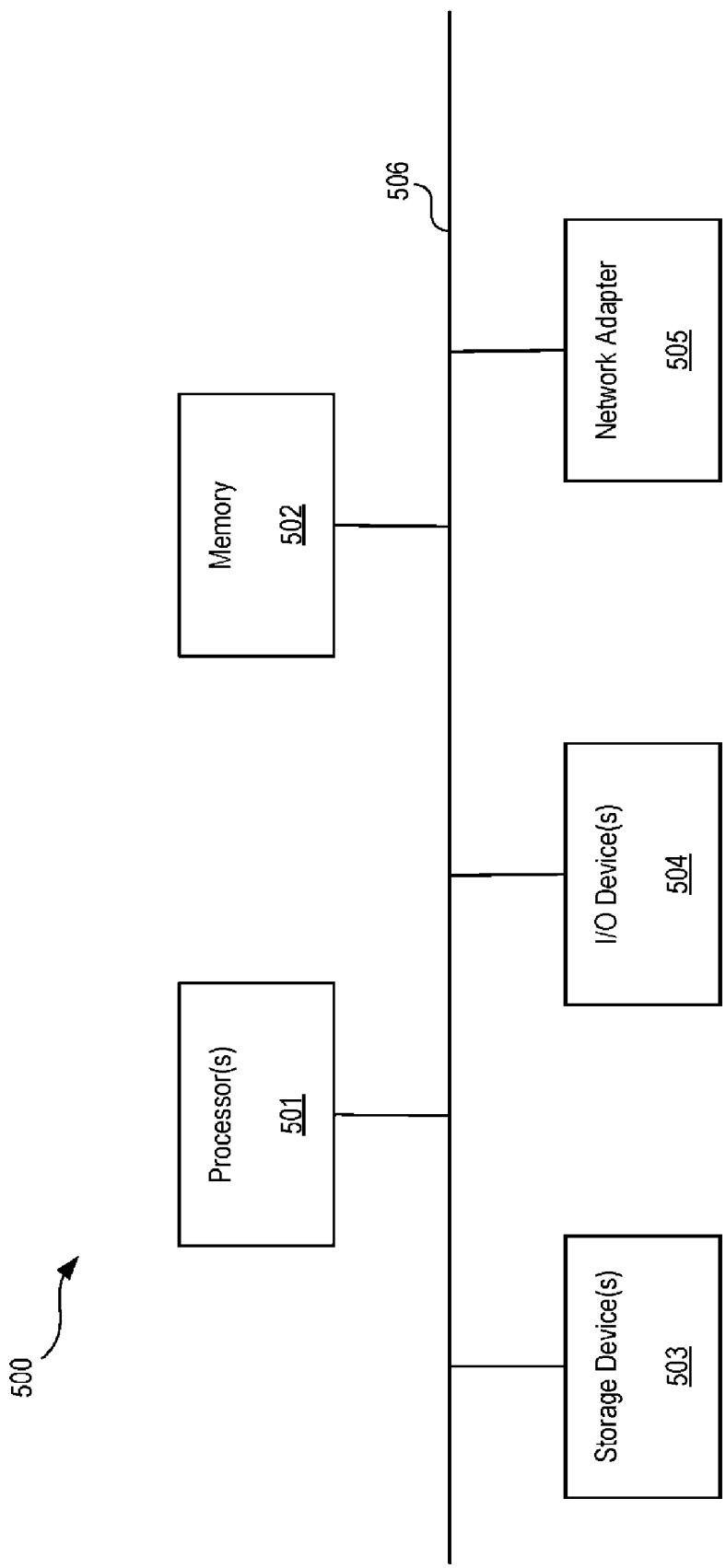
FIG. 5 is a block diagram illustrating a diagrammatic representation of a machine in the example form of a computer system operable to perform aspects of the disclosed technology.

FIG. 5 is a block diagram illustrating a diagrammatic representation of a machine in the example form of a computer system operable to perform aspects of the disclosed technology. The computing system 500 may be a 5G NR system, components of a 5G NR system, a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a handheld console, a (handheld) gaming device, a music player, any portable, mobile, handheld device, wearable device, or any machine capable of executing a set of instructions, sequential or otherwise, that specify actions to be taken by that machine.

The computing system 500 may include one or more central processing units ("processors") 502, memory 504, input/output devices 506 (e.g., keyboard and pointing devices, touch devices, display devices), storage devices 508 (e.g., disk drives), and network adapters 510 (e.g., network interfaces) that are each connected to an interconnect 512. The interconnect 512 is illustrated as an abstraction that represents any one or more separate physical buses, point to point connections, or both connected by appropriate bridges, adapters, or controllers. The interconnect 512, therefore, may include, for example, a system bus, a peripheral component interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus (e.g., Firewire).

The memory 504 and storage devices 508 are computer-readable storage media that may store instructions that implement at least portions of the various embodiments. In addition, the data structures and message structures may be stored or transmitted via a data transmission medium (e.g., a signal on a communications link). Various communications links may be used (e.g., the Internet, a local area network, a wide area network, or a point-to-point dial-up connection). Thus, computer readable media can include computer readable storage media (e.g., non-transitory media) and computer readable transmission media.

The instructions stored in memory 504 can be implemented as software and/or firmware to program the processor 502 to carry out actions described above. In some embodiments, such software or firmware may be initially provided to the computing system 500 by downloading it from a remote system through the computing system 500 (e.g., via network adapter 510).

The various embodiments introduced herein can be implemented by, for example, programmable circuitry (e.g., one or more microprocessors, programmed with software and/or firmware), or entirely in special-purpose hardwired circuitry (e.g., non-programmable circuitry), or in a combination of such forms. Special-purpose hardwired circuitry may be in the form of, for example, one or more application-specific integrated circuits (ASICs), programmable logic devices (PLDs), field-programmable gate array (FPGAs), etc.

CONCLUSION

The embodiments set forth herein represent the necessary information to enable those skilled in the art to practice the embodiments and illustrate the best mode of practicing the embodiments. Upon reading the description in light of the accompanying figures, those skilled in the art will understand the concepts of the disclosure and will recognize applications of these concepts that are not particularly addressed herein. These concepts and applications fall within the scope of the disclosure and the accompanying claims.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method for saving power during data transfer between chips coupled to a baseband (BB)-radio frequency (RF) interface, the method comprising:
    receiving one or more resource blocks including symbol information; and
    for a given resource block in the one or more resource blocks:
        determining, based on the symbol information, a number of excess bits within the given resource block;
        removing the number of excess bits from the given resource block;
        performing data compression on the given resource block based on (1) rotating the given resource block to a direct current frequency and (2) applying a coding scheme on the given resource block to form a compressed resource block; and
        transmitting the compressed resource block through the BB-RF interface,
    wherein in a downlink direction, the number of excess bits is based on an uplink gain information included within the symbol information.

2. The method of claim 1, wherein the symbol information includes a signal to noise ratio (SNR) requirement and/or error vector magnitude (EVM) requirement.

3. The method of claim 2, wherein the EVM requirement and the number of excess bits are directly related.

4. The method of claim 1, wherein the symbol information is transferred in predetermined intervals on the BB-RF interface.

5. The method of claim 1, wherein the symbol information is transferred on the BB-RF interface prior to performing data compression.

6. The method of claim 1, wherein the chips include a BB chip and an RF chip, and wherein in an uplink direction, the compressed resource block is transmitted from the BB chip to the RF chip.

7. The method of claim 1, further comprising:
upon receiving the compressed resource block in the downlink direction, performing channel filtration and spur cancellation.

8. The method of claim 1, further comprising:
upon receipt of the compressed resource block, causing decompression of the compressed resource block by rotating the compressed resource block to an original frequency.

9. The method of claim 8, further comprising:
causing recovery of the number of excess bits based on an uplink gain information the uplink gain information.

10. The method of claim 1, wherein the direct current frequency is 0 Hz, wherein rotating the given resource block around the direct current frequency enables the data compression to be performed without significant degradation of the given resource block.

11. The method of claim 1, wherein the coding scheme is a differential coding scheme.

12. The method of claim 1, wherein performing data compression further comprises:
reducing a number of bits in the compressed resource block based on a modulation scheme, wherein the modulation scheme is included in the symbol information.

13. A method for saving power during data transfer between chips coupled to a baseband (BB)-radio frequency (RF) interface, the method comprising:
receiving a compressed resource block, wherein the compressed resource block is a result of a decompressed resource block including symbol information being (1) reduced by removing excess bits based on a signal to noise ratio, (2) rotated to direct current frequency, and (3) compressed based on an application of a coding scheme; and
decompressing the compressed resource block based on (1) rotating the compressed resource block to an original frequency and (2) recovering excess bits based on uplink gain information,
wherein the direct current frequency is 0 Hz, wherein rotating the decompressed resource block to the direct current frequency enables compression to be performed without significant degradation of the decompressed resource block.

14. The method of claim 13, wherein the symbol information includes any of a signal to noise ratio (SNR) requirement, error vector magnitude (EMV) requirement, resource block configuration, and/or modulation scheme.

15. The method of claim 13, wherein the coding scheme is a differential coding scheme.

16. A system comprising:
a processor; and
a memory having instructions stored thereon that, when executed by the processor, cause the system to:
receive one or more resource blocks and symbol information; and
for a given resource block in the one or more resource blocks:
determine, based on the symbol information, a number of excess bits within the given resource block;
remove the number of excess bits from the given resource block;
perform data compression on the given resource block based on (1) rotating the given resource block to direct current frequency and (2) applying a coding scheme to the given resource block to form a compressed resource block; and
transmit the compressed resource block on a baseband (BB)-radio frequency (RF) interface,
wherein in a downlink direction, the number of excess bits is based on an uplink gain information included within the symbol information.

17. The system of claim 16, further comprising:
a BB chip and an RF chip, each coupled to the BB-RF interface.

18. The system of claim 17, wherein the BB chip, the RF chip, and the BB-RF interface are part of a mobile user device.

* * * * *